United States Patent
Feuling

(10) Patent No.: US 6,336,471 B1
(45) Date of Patent: Jan. 8, 2002

(54) FLOW SYSTEM FOR ENHANCING UNDIRECTIONAL FLUID FLOW

(76) Inventor: James J. Feuling, 686 Ash Ave., Chula Vista, CA (US) 92010

(*) Notice: Subject to any disclaimer, the term of this patent is extended or adjusted under 35 U.S.C. 154(b) by 0 days.

(21) Appl. No.: 08/441,582

(22) Filed: May 15, 1995

Related U.S. Application Data

(63) Continuation of application No. 07/847,872, filed on Mar. 9, 1992, now abandoned, which is a continuation of application No. 07/711,376, filed on Jun. 6, 1991, now abandoned, which is a continuation of application No. 07/571,824, filed on Aug. 24, 1990, now abandoned, which is a continuation of application No. 07/496,055, filed on Mar. 16, 1990, now abandoned, which is a continuation of application No. 07/264,001, filed on Oct. 24, 1988, now abandoned, which is a continuation of application No. 06/494,874, filed on May 16, 1983, now abandoned, which is a continuation-in-part of application No. 06/283,996, filed on Jul. 16, 1981, now abandoned.

(51) Int. Cl.⁷ .................................................. F15D 1/02
(52) U.S. Cl. ..................... 138/39; 138/114; 138/109; 60/312; 181/227; 181/228
(58) Field of Search ..................... 138/37, 39, 40, 138/44, 114, 109, 177; 60/312, 314, 323; 181/227, 228, 248, 251

(56) References Cited

U.S. PATENT DOCUMENTS

| | | | | |
|---|---|---|---|---|
| 1,909,394 A | * | 5/1933 | Dodge | |
| 2,107,382 A | * | 2/1938 | Maddock | 280/796 |
| 2,134,920 A | * | 11/1938 | Kadenog | 60/314 |
| 2,147,200 A | * | 2/1939 | Kadiney | 60/314 |
| 2,168,528 A | * | 8/1939 | Kadenag | 60/314 |
| 2,827,124 A | * | 3/1958 | Woodbury | 181/251 |
| 2,906,364 A | * | 9/1959 | Crouch et al. | |
| 3,254,484 A | * | 6/1966 | Kopper | |
| 3,329,237 A | * | 7/1967 | Straw | 181/249 |
| 3,374,857 A | * | 3/1968 | Hutchins | |
| 3,434,280 A | * | 3/1969 | Burkhart | 181/249 |
| 3,520,270 A | * | 7/1970 | Muller | 60/314 |
| 3,716,992 A | * | 2/1973 | Stohl | 60/323 |
| 3,752,260 A | * | 8/1973 | Heath | 181/249 |
| 3,772,887 A | * | 11/1973 | Ziegler | 60/314 X |
| 3,892,546 A | * | 7/1975 | Grisell | 138/37 X |
| 3,946,558 A | * | 3/1976 | Breknues | 60/274 |
| 4,111,278 A | * | 9/1978 | Bergman | 181/249 |
| 4,206,600 A | * | 6/1980 | Feuling | 60/312 |
| 4,305,477 A | * | 12/1981 | Moore | 181/249 |
| 4,418,789 A | * | 12/1983 | Eckert | 181/255 |
| 4,779,703 A | * | 10/1988 | Takiguchi et al. | 181/228 |

FOREIGN PATENT DOCUMENTS

| | | | | |
|---|---|---|---|---|
| GB | 593816 | * | 10/1947 | |
| GB | 1565374 | * | 4/1980 | 181/249 |

* cited by examiner

Primary Examiner—James Hook
(74) Attorney, Agent, or Firm—Kelly Bauersfeld Lowry & Kelley, LLP

(57) ABSTRACT

An improved fluid flow system for enhancing fluid flow through an opening. The first embodiment uses a first extension member for extending an opening through a perpendicular surface and a second extension member with a generally converging introductory section secured in a sealed overlapping relationship to the distal end of the first extension member. A second embodiment uses a pair of conduits of equal cross-section with a bulbous section therebetween with one of the conduits inserted into the bulbous section. A third embodiment with unequal cross-sections with the smaller diameter conduit inserted into the larger diameter conduit and sealed thereto for forming a continuous conduit.

22 Claims, 2 Drawing Sheets

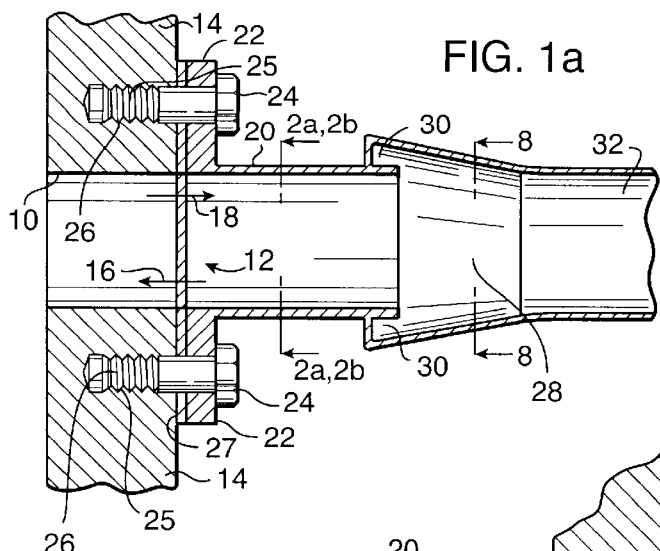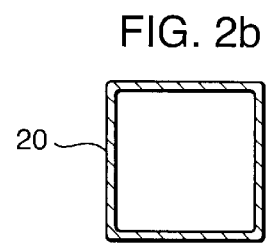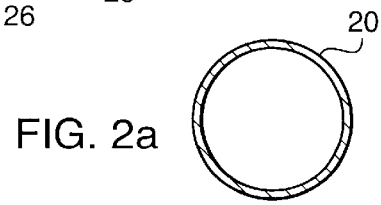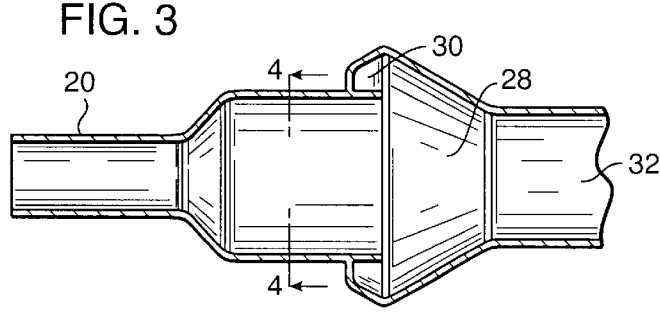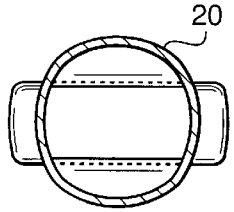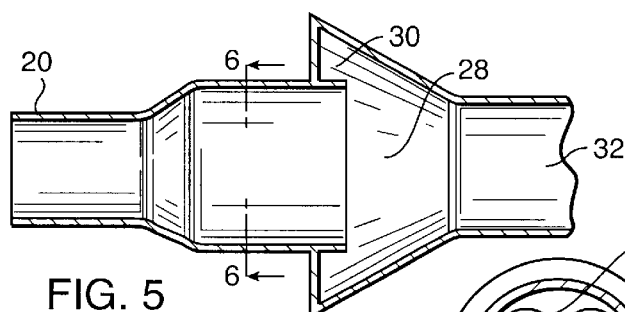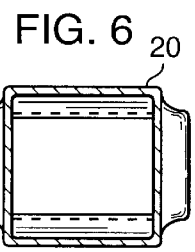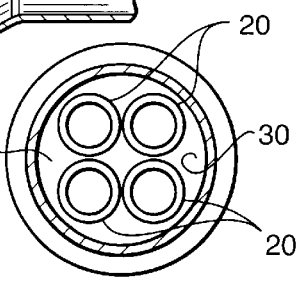

FLOW SYSTEM FOR ENHANCING UNDIRECTIONAL FLUID FLOW

This is a continuation of copending application(s) Ser. No. 07/847,872 filed on Mar. 9, 1992 now abandoned, which is a continuation of copending application(s) Ser. No. 07/711,376 filed on Jun. 6, 1991 now abandoned, which is a continuation of copending application(s) Ser. No. 07/571,824 filed on Aug. 24, 1990 now abandoned, which is a continuation of copending application(s) Ser. No. 07/496,055 filed on Mar. 16, 1990 now abandoned, which is a continuation of copending application(s) Ser. No. 07/264,001 filed on Oct. 24, 1988 now abandoned, which is a continuation of copending application(s) Ser. No. 06/494,874 filed on May 16, 1983 now abandoned, which is a continuation in part of copending application Ser. No. 06/283,996 filed on Jul. 16, 1981 now abandoned.

BACKGROUND OF THE INVENTION

This invention relates in general to the maintaining of a smooth one-way (uni-directional) flow of fluids through openings through a surface of various configurations and specifically to enhance the fluid flow.

A continuing effort is being extended to improve the efficiency of fluids taken into and expelled from internal combustion engines, compressors, pumps and the like.

This invention is an improvement to my previous invention covered in U.S. Pat. No. 4,206,600 issued Jun. 10, 1980.

M. Kadenacy teaches in U.S. Pat. No. 2,168,528 the use of a nozzle extending from an engine exhaust part into a single expanded necked down area then into a conventional exhaust system. This system has undesirable draw-backs in that the necking down of the engine exhaust flow in this manner creates back pressure and the large expansion area or pocket, compared to nozzle diameter, would cause the immediate formation of a severe negative pressure wave which would then return to the cylinder space at other than the optimum time.

French Patent Number 818,457 teaches a first tubular member extending from the exhaust part of an internal combustion engine into the first one of a plurality of overlapping conic neck down sections in a series relationship. The large volume into which the tubular member empties will act similarly as if the nozzle emptied directly into the atmosphere and will produce an immediate negative wave detrimental to engine operation.

Other patents directed to exhaust gasses and their control are U.S. Pat. Nos. 2,147,200; 3,520,270; 3,772,887; 3,946,558; 3,983,696 and 3,716,992.

At the present time, much work is being done to provide fluid flow systems for automobiles for use with both intake and exhaust gas flow which will reduce fuel consumption of that engine while maintaining or improving output power. There is, therefore a need for new and improved fluid flow systems for internal combustion engines and the like.

SUMMARY OF THE INVENTION

The above problems, and others not mentioned, are overcome by the flow systems of the instant invention which comprise generally conduit means of equal or different cross-sections with a form of expansion chamber therebetween. In one embodiment a first extension member of uniform cross-sectional area for extending a fluid flow opening through a surface to a position away from the surface and a second extension member connected to the first extension member. The second extension member has a generally converging introductory section. The larger inlet end of which surrounds the free end of the first extension member and is secured thereto in a sealed overlapping relationship forming a pocket therebetween. The pocket cross-sectional area may be in the range of from 120 to 300% of the cross-sectional area of said first extension member. An ideal range is approximately 150–200%.

In another embodiment first and second conduits are joined by a bulbous area into which the distal end of one conduit is inserted into the bulbous area a selected distance related to the conduits and bulbous area diameters. The inserted end is in the direction of fluid flow.

In another embodiment the conduits are of different diameters and the smaller diameter conduit is inserted into the larger diameter conduit. The larger diameter conduit is reduced in size at one end and is sealed to the smaller inserted conduit. The larger conduit acts as the expansion chamber as well as a conduit. The fluid flows in the direction of the larger conduit.

In dynamometer and fluid flow tests it has been found that this novel system provides improved performance. While the manner in which this system produces improved results over known systems it is not fully understood it is believed that the system entrance configuration serves to dampen or cancel the positive or opposing pressure wave returning toward the fluid source.

An object of this invention is to effectively eliminate adverse pressure waves occurring in internal combustion engine exhaust systems.

Another object of this invention is to effectively eliminate adverse pressure waves occurring in internal combustion engine air intake systems.

Another object of this invention is to effectively eliminate adverse pressure waves occurring in any fluid flow system where the fluid flow is temporarily interrupted.

These and other objects and advantages of the invention will become better understood by reference to the following detailed description when considered with the drawings, in which:

BRIEF DESCRIPTION OF THE DRAWINGS

FIG. 1 is a vertical section taken along the centerline of one embodiment of the fluid flow enhancing apparatus of the invention;

FIG. 2a is one configuration of a showing of FIG. 1 taken along line 2—2;

FIG. 2b is a second configuration of a showing of FIG. 1 taken along line 2—2;

FIG. 3 is a vertical section taken along the centerline of a second embodiment of the fluid flow enhancing apparatus of the invention;

FIG. 4 is a showing of FIG. 3 taken along line 4—4;

FIG. 5 is a vertical section taken along the centerline of a third embodiment of the fluid flow enhancing apparatus of the invention;

FIG. 6 is a showing of FIG. 5 taken along line 6—6;

FIG. 7 is a vertical section taken along the center line of a second embodiment of the fluid flow enhancing apparatus of the invention;

FIG. 8 is a showing taken along line 8—8 of FIG. 1 showing four conduits enclosed by one overlapping chamber;

DETAILED DESCRIPTION OF THE INVENTION

Figure 10:
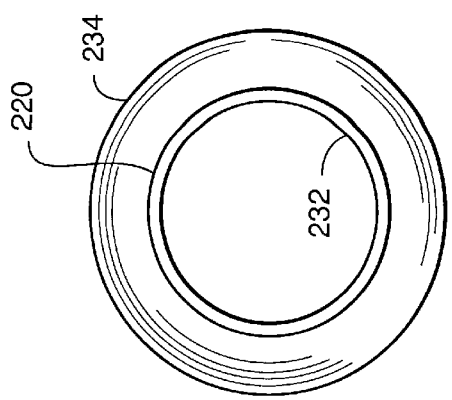
FIG. 10 is a showing taken along line 10—10 of FIG. 9 or FIG. 11.

The theory of the operation of the hereinafter discussed device is the same as that theory set forth in my issued U.S. Pat. No. 4,206,600 issued on Jun. 10, 1980 and is hereby incorporated by reference.

Referring now to FIG. 1, shown is a portion of a fluid flow tube 10 which has an opening aperture 12 terminating at a surface or bulkhead 14. The fluid flowing through the flow tube 10 either flows into or out of the aperture 12 along arrows 16, 18 respectively. The fluid flowing therethrough can be either gaseous or liquid, examples of fluids for the purpose of explanation and not by way of limitation are internal combustion exhaust gasses which would flow in the direction of arrow 18; internal combustion intake air which would flow in the direction of arrow 16; air compressor intake air which would flow in the direction of arrow 16; liquid pumps wherein the input flow would be along arrow 16 and output flow along arrow 18; hydraulic systems where flow could be in either direction 16 or 18 or in both directions at different times. These are but a few examples where this invention can be usefully employed for energy conservation. It should be understood that both the input and output of a fluid flow system could or would employ one of the devices of the invention. The device of this invention may be employed on any device that transfers a fluid in only one direction through an opening to enhance that flow particularly when the flow is subject to pressure changes.

The device comprises a first orifice extension 20 which is attached to bulkhead 14 in an abutting relationship with fluid flow tube 10. Any convenient means may be used to attach extension 20 to bulkhead 14. A flange 22 is shown attached by end threads 25 of cap screws 24 engaging threads 26 within the bulkhead in a conventional threaded engagement. A gasket 27 is generally included between flange 22 and bulkhead 14 to insure a fluid-tight seal.

In most applications the bulkhead adjacent end of the extension 20 will be configured to substantially mate with the configuration of the orifice 12. That is when orifice 12 is rectangular in cross-section the adjacent end of extension 20 will likewise be rectangular in cross-section, when the orifice 12 is circular in cross-section the adjacent end of extension 20 will be circular in cross-section, etc.

In some applications, such as for example and not by way of limitation, internal combustion exhaust systems, the adjacent end of extension 20 may be less in cross-sectional area than the aperture 12. This slightly reduced cross-sectional area at extension 20 will slightly increase the pressure of the fluid traveling through fluid flow tube 10 as it travels through extension 20. An example would be where the speed of fluid flow in tube 10 is 250 feet per second and the ideal or desired speed of fluid flow through extension 20 is 300 feet per second. It should be understood that fluid flow speeds leaving flow tube 10 may be increased by selecting the cross-sectional area of extension 20 in a range of from 60% to 100% of the cross-sectional area of fluid flow tube 10 and aperture 12 while successfully practicing this invention.

The extension 20 may take varied and different cross-sectional configurations along its length, that is it may be tubular along its entire length, as shown in FIG. 2a, it may be rectangular along its entire length as shown in FIG. 2b, it may be rectangular at one end and circular at the opposite end as shown in FIGS. 3 and 4, it may be rectangular at each end and substantially square at its other end as shown in FIGS. 5 and 6. The critical requirement is that it maintains the same or substantially the same cross-sectional area, along its entire length. The extension 20 may be formed from a section or length of tube stock into various end to end configurations to insure substantially the same cross-sectional area along its entire length regardless of selected end cross-sectional configurations.

A second extension 28 with a divergent end 30 is attached to extension 20 in a sealed overlap relationship. Second extension 28 is attached to a generally circular tube 32 of finite length which has a cross-sectional area substantially equal to the cross-sectional area of extension 20. The cross sectional area of the extension 20 overlapped diverging portion 30 of second extension 28 is selected so that the speed of flow through tube 32 is in the range of 60% to 100% of the flow speed through extension 20. The cross-sectional configurations of the end of extension 20 will generally have the same general configuration of the divergent end of extension 28; however, this is not a critical requirement and these cross-sectional configurations may vary one from the other. The cross-sectional area of the space between the distal end of extension 20 and the adjacent inner side walls of divergent section of second extension 28 is in the range of from 120% to 300% of the cross-sectional area of the distal end of extension 20. Ideally, the cross-sectional area of the space between the distal end of extension 20 and the adjacent inner side walls of the divergent section of the second extension 28 is 150%–200% of the cross-sectional area of the distal end of extension 20 or extensions 20.

Referring now specifically to FIG. 7, this embodiment has the same features used for the same purposes as the embodiment shown in FIG. 1. In this embodiment the extension 20 is not required as the conduit 110 serves the same purpose. Divergent conduit 128 serves the same purpose as second extension 28, pocket 130 is the same as the pocket formed by divergent end 30 of second extension 28 overlapping the first extension 20 and the opening 112 lies between the convergent end of conduit 128 and tube 32, rather than between first extension 20 and convergent end 30 of second extension 28. The gasket flange 22, connectors, etc., generally remain substantially the same. The embodiment of FIG. 7 allows the various features to be cast into the housing 114 so that the system can conveniently be attached to an existing extender tube 32, especially when the extender tube 32 is a portion of a conventional intake or exhaust system of an internal combustion engine. It should be understood that the various elements of this embodiment can take the various shapes of corresponding elements of FIG. 1 as hereinbefore discussed.

Figure 9:
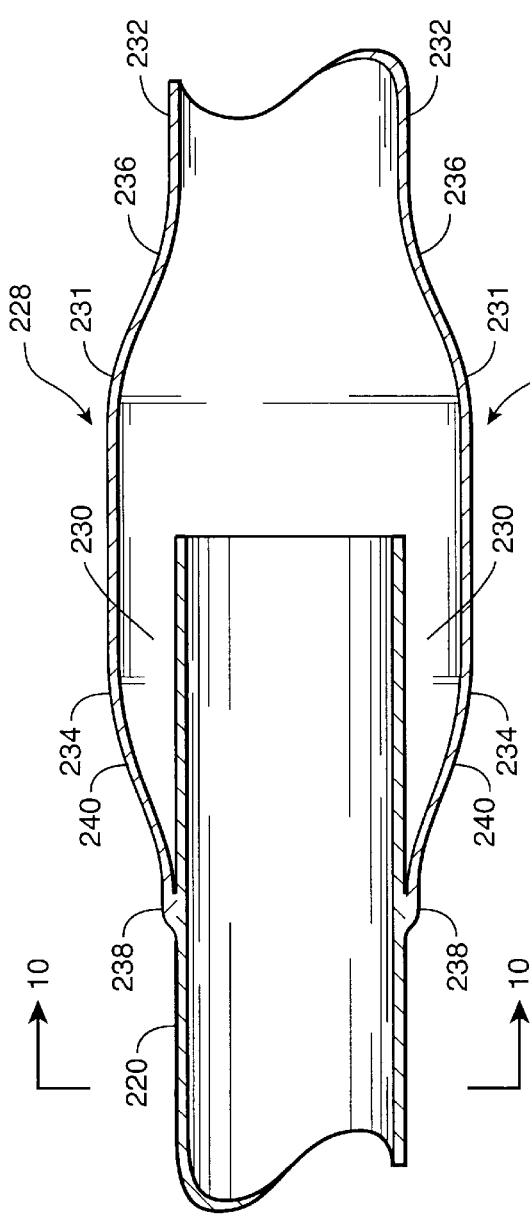
FIG. 9 is a vertical section taken along the center line of a third embodiment of the fluid flow enhancing apparatus of the invention.

Referring now to FIGS. 9 and 10, this embodiment is utilized for the same purposes as the other embodiments hereinbefore defined. In this embodiment conduits 220 and 232 have substantially equal diameter. One end of conduit 232 includes an enlarged bulbous area 228. The ends 236 and 240 of the bulbous area 228 taper down to the diameter of conduits 220 and 232. The end 240 connects to conduit 220 at location or end 238 in a sealed relationship therewith. This connection may be formed, by way of example and not by way of limitation, by welding or the like one to the other. Any other conventional connecting means may be utilized to practice the invention. The distal end 221 of conduit 220 which is inserted into the bulbous area 228 may extend a selected distance therein between locations 231 and 234. For the diameter size ratios of the conduit 220 and bulbous area 228 as shown in FIGS. 9 and 10, the length of the inserted distal end of conduit 220 is approximately equal to the diameter of conduit 220. It has been found that for different size ratios of the conduit and bulbous area diameters that the length of the inserted conduit distal end may be required to vary from 50% to 110% of the inserted conduit diameter to successfully practice the invention. The diameter of conduits 220 and 232 is shown to be approximately 75% of the diameter of the bulbous area. This seems to be ideal for the diameter size ratios of the elements on the insertion length of the embodiment shown in FIGS. 9 and 10. Ends 236 and 240 are shown to taper at an angle toward the conduits. This tapered angle shown at approximately 20° appears to be ideal for end 236 and end 240; however, it has been found that different configured slopes of end 240 may be utilized to successfully practice the invention. It can be readily seen in FIG. 10 that conduits 220 and 232 have the same diameter. The direction of fluid flow in this embodiment is from conduit 220 through the bulbous section 228 and out conduit 232.

Figure 11:
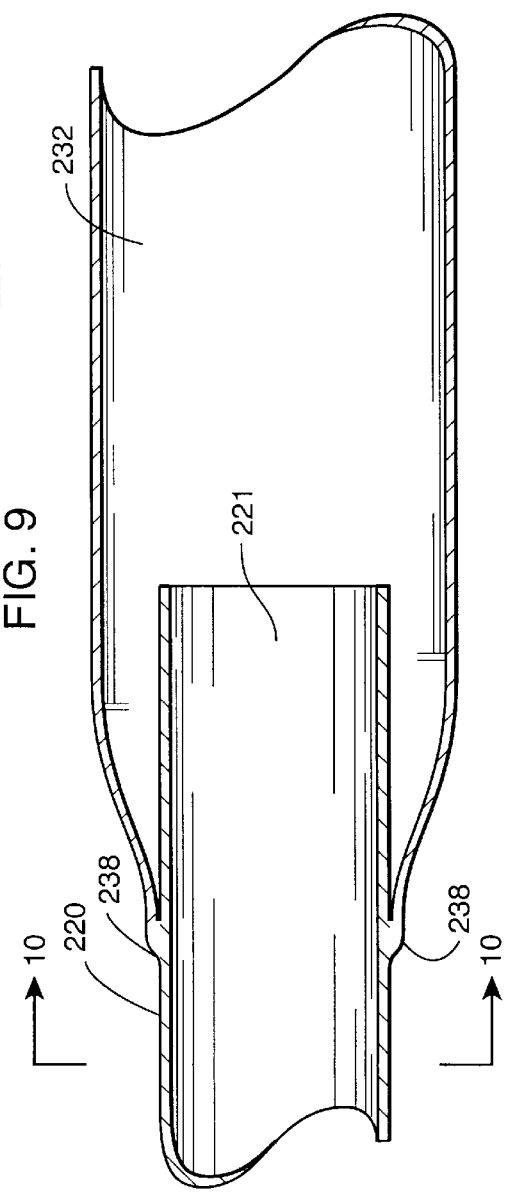
FIG. 11 is a vertical section taken along the center line of a fourth embodiment of the fluid flow enhancing apparatus of the invention.

Referring now specifically to FIGS. 10 and 11, in this embodiments conduits 220 and 232 have unequal diameters. The distal end 221 is inserted into conduit 232 and sealed thereto at location 238 by means hereinbefore mentioned. In this embodiment conduit 220 is approximately 75% of the diameter of conduit 232 and the insertion distance of distal end 221 is approximately equal to the diameter of conduit 220. As discussed above, the insertion distance may vary according to the size ratios of conduits 220 and 232.

It should be clearly understood that although the detailed discussion, for the purpose of clarity, teaches a single flow through, a flow tube 10 or conduits 110, 220 a plurality of like flow tubes 10, or conduits 110, 220 as shown in FIG. 8, may terminate into a single convergent second extension 28 or conduit 128 connected to and sealed by a back plate 21 while practicing this invention. For the purpose of example, and not by way of limitation, it is not uncommon for internal combustion engines or other devices having fluid flow to have eight or more separate conduits or first extension means terminating into a single second extension 28 or conduit 128. This invention will easily accommodate any number of flow tubes 10, 110 or 220, terminating into a single convergent chamber 28, 128, or enlarged conduit 232.

While certain specific proportions and arrangements have been described in the above description, these may be varied, where suitable, within the limits described above.

Other variations, ramifications and applications of the present invention will occur to those skilled in the art upon reading the present disclosure. These are intended to be included within the scope of the invention, as defined in the amended claims.

Having thus described the invention, which is claimed as new and useful and desired to be secured by United States Letters Patent.

I claim:

1. An apparatus for facilitating exhaust flow to reduce back pressure in an internal combustion engine, comprising:
   a first non-apertured longitudinally extending conduit having a continuous cross-sectional configuration, having a proximal end for receiving pulsating exhaust of an internal combustion engine, and a distal end; and
   a second non-apertured conduit co-axially aligned with the first conduit, including a first segment of continuous cross-sectional configuration surrounding the distal end of the first conduit, the first segment defining a greatest cross-sectional area of the second conduit, and a second segment extending from the first segment and defining a tapered portion that connects to an exterior surface of the first conduit between the proximal and distal ends thereof in a sealed and fixed relationship therewith.

2. The apparatus of claim 1, wherein the distal end of the first conduit extends into the first segment a distance of between 50% and 110% of the first conduit's diameter.

3. The apparatus of claim 2, wherein the distal end of the first conduit extends into the first segment a distance approximating the diameter of the first conduit.

4. The apparatus of claim 1, wherein the diameter of the first segment is 120% to 300% of the diameter of the first conduit.

5. The apparatus of claim 4, wherein the diameter of the first conduit is approximately 75% of the diameter of the proximal segment.

6. The apparatus of claim 1, wherein the first segment comprises an enlarged bulbous area.

7. The apparatus of claim 6, wherein the bulbous area tapers to a third segment of the second conduit generally opposite the second segment and having a cross-sectional area approximating the cross-sectional area of the first conduit.

8. The apparatus of claim 1, wherein the second segment tapers to the first conduit at an approximately 20° angle.

9. The apparatus of claim 1, wherein the cross-sectional configuration of the first conduit is circular.

10. An apparatus for facilitating exhaust flow to reduce back pressure in an internal combustion engine, comprising:
    a first non-apertured longitudinally extending conduit having a continuous cross-sectional configuration, having a proximal end for receiving pulsating exhaust of an internal combustion engine, and a distal end; and
    a second non-apertured conduit co-axially aligned with the first conduit, including a first segment of continuous cross-sectional configuration surrounding the distal end of the first conduit, the first segment defining a greatest cross-sectional area of the second conduit having a diameter of between 120% to 300% of the diameter of the first conduit, and a second segment extending from the first segment and defining a tapered portion that connects to an exterior surface of the first conduit between the proximal and distal ends thereof in a sealed and fixed relationship therewith;
    wherein the distal end of the first conduit extends into the first segment a distance of between 50% and 110% of the first conduit's diameter.

11. The apparatus of claim 10, wherein the distal end of the first conduit extends into the first segment a distance approximating the diameter of the first conduit.

12. The apparatus of claim 10, wherein the diameter of the first conduit is approximately 75% of the diameter of the proximal segment.

13. The apparatus of claim 10, wherein the first segment comprises an enlarged bulbous area.

14. The apparatus of claim 13, wherein the bulbous area tapers to a third segment of the second conduit generally opposite the second segment and having a cross-sectional area approximating the cross-sectional area of the first conduit.

15. The apparatus of claim 10, wherein the second segment tapers to the first conduit at an approximately 20° angle.

16. The apparatus of claim 10, wherein the cross-sectional configuration of the first conduit is circular.

17. An apparatus for facilitating exhaust flow to reduce back pressure in an internal combustion engine, comprising:

a first non-apertured longitudinally extending conduit having a continuous cross-sectional configuration, having a proximal end for receiving pulsating exhaust of an internal combustion engine, and a distal end; and a second non-apertured conduit co-axially aligned with the first conduit, including a first segment of continuous cross-sectional configuration comprising an enlarged bulbous area surrounding the distal end of the first conduit, the first segment defining a greatest cross-sectional area of the second conduit, and a second segment extending from the first segment and defining a tapered portion that connects to an exterior surface of the first conduit between the proximal and distal ends thereof in a sealed and fixed relationship therewith, the first segment tapering generally opposite the second segment to a third segment having a cross-sectional area approximating the cross-sectional area of the first conduit;

wherein the distal end of the first conduit extends into the first segment a distance of between 50% and 110% of the first conduit's diameter.

18. The apparatus of claim 17, wherein the distal end of the first conduit extends into the first segment a distance approximating the diameter of the first conduit.

19. The apparatus of claim 17, wherein the diameter of the first segment is 120% to 300% of the diameter of the first conduit.

20. The apparatus of claim 19, wherein the diameter of the first conduit is approximately 75% of the diameter of the proximal segment.

21. The apparatus of claim 17, wherein the second segment tapers to the first conduit at an approximately 20° angle.

22. The apparatus of claim 17, wherein the cross-sectional configuration of the first conduit is circular.

\* \* \* \* \*